United States Patent [19]
Kladder

[11] Patent Number: 5,197,862
[45] Date of Patent: Mar. 30, 1993

[54] METHOD AND DEVICE FOR MONITORING RADON MITIGATION SYSTEM

[76] Inventor: Douglas L. Kladder, 222 E. Dale, Colorado Springs, Colo. 80903

[21] Appl. No.: 833,097

[22] Filed: Feb. 10, 1992

[51] Int. Cl.$^5$ .............................................. F04D 25/08
[52] U.S. Cl. ........................................ 417/53; 417/63
[58] Field of Search ...................... 417/63, 53; 454/909

[56] References Cited
U.S. PATENT DOCUMENTS

| | | |
|---|---|---|
| 4,189,094 | 2/1980 | Robinson . |
| 4,352,319 | 10/1982 | Yoho . |
| 4,362,922 | 12/1982 | Anderson . |
| 4,466,341 | 8/1984 | Grogan ................................. 454/61 |
| 4,726,824 | 2/1988 | Staten . |
| 4,915,020 | 4/1990 | Dumbeck ............................ 454/909 |
| 4,934,256 | 6/1990 | Moss et al. ............................ 454/61 |
| 4,988,237 | 1/1991 | Crawshaw .......................... 454/909 |
| 5,076,763 | 12/1991 | Anastos et al. ........................ 417/36 |

OTHER PUBLICATIONS
"Radon Contractor Proficiency Program Interim Radon Mitigation Standards," Dec. 15, 1991.

Primary Examiner—Richard A. Bertsch
Assistant Examiner—David W. Scheuermann
Attorney, Agent, or Firm—Linda Flewellen Gould

[57] ABSTRACT

The effectiveness of a radon mitigation system is in large part a function of the vacuum and air flow produced by a fan. Since a relationship exists between the vacuum and air flow of any given fan, it is advantageous to be able to identify any malfunctions in the system which result in fan air flow being increased or decreased. Such changes in air flow may impede the ability of the system to alleviate radon concentrations. Fan air flow may be monitored by measuring current draw of the fan with an ammeter or other electric current measuring device. Such measurements may be facilitated by mounting the ammeter in a control unit including a reduction transformer, which feeds 24 volt electric current to the fan. After measurements of fan current draw have been measured and indicated, current may be increased to 120 volts by a fan voltage booster, to power the fan.

9 Claims, 2 Drawing Sheets

METHOD AND DEVICE FOR MONITORING RADON MITIGATION SYSTEM

1.1 BACKGROUND OF THE INVENTION

1.1 Technical Field

This invention pertains to a method and device for indicating failures within a radon mitigation system. The method involves installation and use of a device to detect malfunctions in a radon mitigation system and provide notice of such a malfunction.

1.2 Background Art

The presence of radon gas in occupied buildings may contribute to incidence of lung cancer. Because of the possible detrimental effects of radon, the United States Environmental Protection Agency (EPA) recommends that radon levels in occupied structures be maintained at less than 4 PicoCuries per liter (4 pCi/l). Radon is a naturally occurring gas, which ma infiltrate buildings in concentrations higher than the maximum EPA recommended guidelines. In these situations, a variety of mechanical systems may be used to reduce radon concentrations.

For example, radon may be removed from a building by creating a mechanically induced vacuum beneath the building, into which the radon may be collected. Alternatively, ventilation in the structure may be increased to remove radon from the structure. Both of these strategies rely on the installation and use of electric fans.

A malfunction in a radon removal system, such as a pluggage in the associated piping system due to debris or ice, or a breach of the piping system, can result in the system not performing as originally designed. Since radon is a colorless and odorless gas, the building owner may not be aware of the decrease in radon removal efficiency due to these conditions, unless some type of failure indication is provided. Furthermore, failures of this type may cause other detrimental conditions within the structure if left unnoticed which can cause significant hazards and operating costs. A device is needed which can detect slight to large increases and decreases in air volume of the fan used for radon mitigation.

The EPA has recommended that each radon removal system include a method of detecting a failure in the mitigation system. See "Radon Contractor Proficiency Program Interim Radon Mitigation Standards," Dec. 15, 1991. Methodology presently utilized within the radon industry to satisfy this recommendation utilizes a pressure indicator that does not sense air flow and therefore does not provide sufficient information to easily detect most system failures. Furthermore, pressure indicators are invasive to the system and have the potential for in-building leaks of radon a well as accumulation of moisture which provides false readings. A system is needed which is totally electric and outside of the air stream and therefore not subject to these potential defects.

Air quality control systems including mechanisms for detecting system failures are known in the prior art. For example, U.S. Pat. No. 4,352,349 to Yoho describes a control circuit for air conditioning systems. The Yoho circuit includes an electrical sensor and temperature sensor for determining whether an exhaust fan is properly operating over a grill in a restaurant. If the exhaust fan is not functioning properly, the circuit is designed to turn off the grill.

Other air purification systems may include sensors to determine when air quality warrants activation of the purification process. For example, the air make-up unit described in U.S. Pat. No. 4,362,922 to Anderson draws outside air into a building, by means of an electric blower. The blower may be activated by a pressure sensor when negative pressure develops within the building.

Similarly, U.S. Pat. No. 4,726,824 to Staten teaches an air purification system to remove pollutants from indoor air. The system includes sensors to determine the presence of such chemicals as ozone and carbon monoxide, which trigger the operation of the air purification mechanism.

Temperature sensors are used in the control system described in U.S. Pat. No. 4,189,094 to Robinson. That system is designed to ventilate indoor swimming pools, rather than air.

While each of these mechanisms known in the prior art is useful for its intended purpose, no mechanism is known which may be easily installed to monitor the efficacy of a radon mitigation system. There exists a need for a mechanism which can be simply installed, which will monitor the effectiveness of a radon mitigation system, and provide information needed to insure that the system is properly functioning.

2. Disclosure of the Invention

2.1 Summary of the Invention

An object of this invention is to provide a method of detecting air flow in a radon mitigation system to provide an easy to read indication of system performance.

Another object of this invention is to provide a device for monitoring a radon mitigation system, which can be easily installed without requiring the assistance of an electrician.

The device used in this method of detecting and eliminating problems in radon mitigation systems comprises a control unit and a fan voltage booster. The control unit has at least two primary elements: a 120 volt to 24 volt reduction transformer, and a performance indicator. The fan voltage booster is a transformer matching the reduction transformer, which increases voltage from 24 volts to 120 volts, to power a fan in the mitigation system. The fan powered in this manner will typically be a commercially available turbo-blower which is commonly used in radon reduction systems. The fan and fan voltage booster can be packaged as an integral unit.

The performance indicator comprises a 0 to 5 amp ammeter mounted in a panel with a visible face or other mechanism for registering current measurements. The ammeter is connected to the fan in such a way that the ammeter measures the amount of current utilized by the fan.

Many radon mitigation systems depend on specific fan induced air flows for effectiveness. A decrease in air flow may result in a decrease in the efficiency of radon removal. Similarly, if too much air is made available to the system, as would result if air duct or pipe to the fan is broken, the resulting increase in available air would reduce radon removal efficiency. Such an increase in air could also adversely affect the building environment, resulting in increased energy costs and potential combustion appliance backdrafting. Because the fan increases its current draw with increases in air flow, measuring the current draw of the fan also serves as an indicator of the air flow through the fan.

The face of the ammeter may be advantageously calibrated so that the meter indicates that the radon mitigation system is functioning properly whenever the ammeter senses appropriate current draw by the fan. Thus, a section of the face of the ammeter corresponding to the position of the ammeter needle when proper current draw is sensed, can be marked in green or otherwise designated. In this manner, the designated area of the ammeter face becomes a proper conditions indicator, since the radon mitigation system should be functioning properly when the needle of the ammeter is in that region.

Similarly, one or more portions of the ammeter face may be marked in red, or otherwise designated, to indicate that a failure in the radon mitigation system has occurred, whenever the ammeter needle resides in one of those portions. So designated portions of the ammeter face may then be regarded as an improper conditions indicator. As will be apparent, many different types of improper conditions indicators may be utilized. For example, an audible alarm may be connected to the ammeter in such a way that the alarm rounds whenever the ammeter detects fan current draw which is less than or greater than that which is desirable for the system.

The amount of air which needs to be handled by a radon mitigation system is specific to each particular building, and will vary from installation to installation. To compensate for this variation, the ammeter may advantageously include a bias adjustment which allows the installer to set the location of the needle indicator to the "green" or proper conditions indicator area after the system has been fully installed and tested for effectiveness. Consequently, a deviation in the needle position indicates a deviation in the radon system characteristics from when it was originally installed. A shield may be provided for the bias adjustment to prevent accidental adjustment of the bias by building occupants.

The ammeter is directly wired into the circuit of the power supply to the radon fan. The power supply may be standard 120 volt line power, or may be reduced to 24 volts via a power transformer. The latter application has the added advantage that the power output to the fan can be supplied via inexpensive and safer low voltage wiring. This wiring is typically two conductor 16 or 18 gauge jacketed cable which can be routed to a remote location of the radon fan up to 50 feet away. This aspect allows for the fan to be located outside of the living envelope of the building as required by the EPA Mitigation Standards, Dec. 15, 1991, while the ammeter and power supply can be conveniently mounted in a frequently occupied portion of the building for occupant viewing. Furthermore, the low voltage aspect of the power supply to the fan allows for easy installation of the wiring similar to that which would be needed for routing security systems and audio speaker wiring. To allow for proper operation of the radon fan, a matching voltage boosting transformer is connected to the fan to allow for normal, 120 volt operation of the fan. The simplicity of the device should allow for the installation by contractor or building owner, in most electrical code jurisdictional areas, without the assistance of a licensed electrician.

As will be evident, the radon mitigation system control device of the instant invention will also be useful in any situation in which the speed of a fan should be monitored and controlled.

The novel features that ar considered characteristic of the invention are set forth with particularity in the claims. The invention itself, both as to its construction and its method of operation, together with additional objects and advantages thereof, will best be understood from the description of specific embodiments which follows, when read in conjunction with the accompanying drawings.

2.2 BRIEF DESCRIPTION OF THE DRAWINGS

2.3 DETAILED DESCRIPTION OF THE PREFERRED EMBODIMENT

Figure 1:
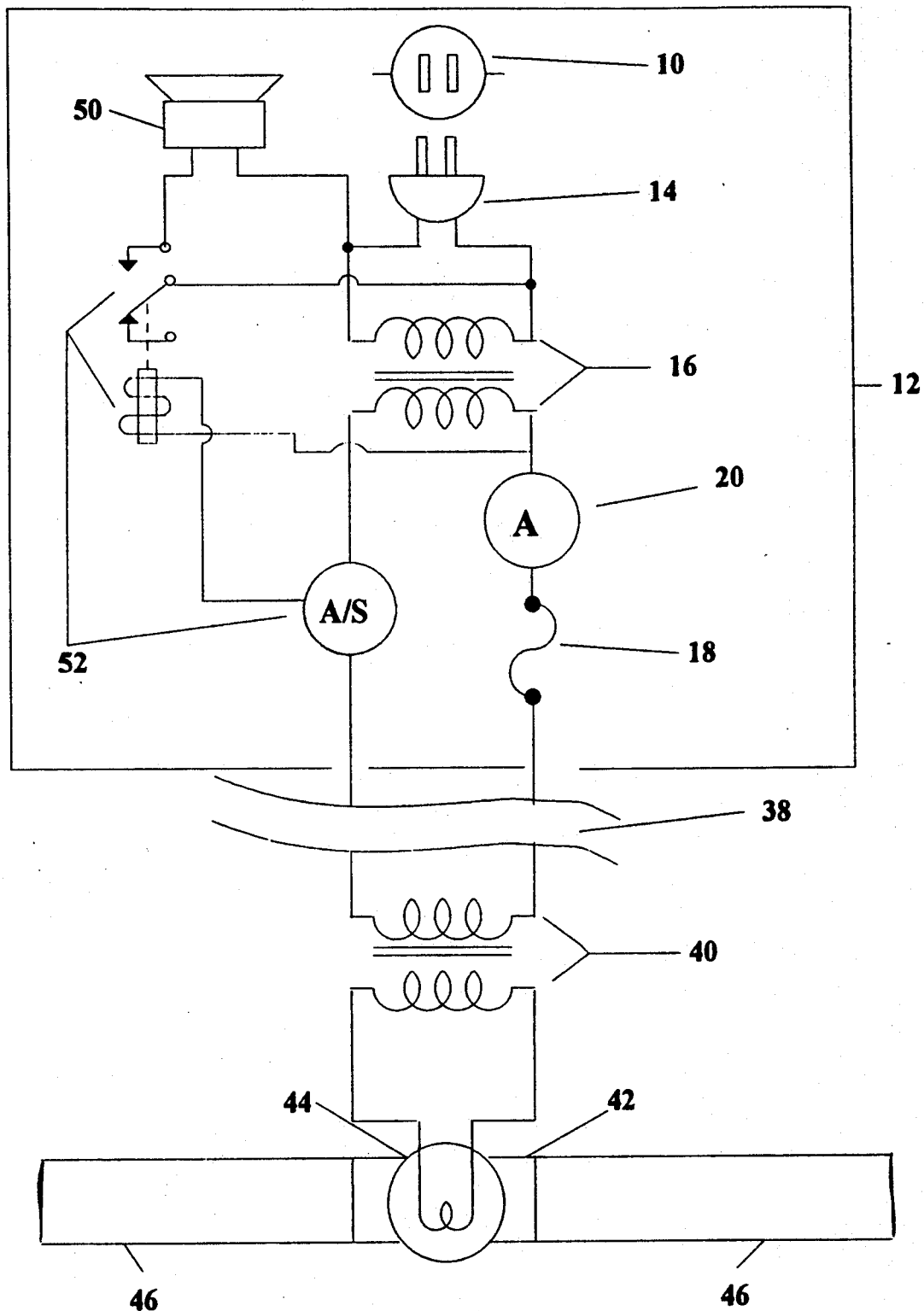
FIG. 1 is a schematic diagram of the mechanism used in this method of monitoring radon mitigation systems.

The method of monitoring the performance of radon mitigation systems according to the present invention can be better understood by reference to FIG. 1. A radon mitigation system 48 frequently utilizes a fan 42, with a fan motor 44, such as a commercially available turbo-blower. This fan 42 is installed so as to provide a pre-determined flow of air into, from, or from beneath a building (not shown) to alleviate radon concentrations. The radon mitigation system 48 may further comprise air ducting 46 by which air is fed to the fan 42, or routed away from the fan 42.

To effectively mitigate unacceptable concentrations of radon, operation of the fan 42 at a predetermined fan speed is desirable. Unexpected problems may occur in the radon mitigation system 48, which result in increases or decreases in the amount of air moved by the fan 42, and thus render ineffective the radon mitigation system 48. For example, if a hole develops in air ducting 46, the resulting air flow supplied to the fan 42 will increase and reduce vacuum applied areas beneath the building, thus reducing radon reduction efficiency. Similarly, a malfunction in the fan motor 44 may result in decreased air flow, and thus adversely affect radon mitigation. Similarly, a restriction in the ducting 46 may reduce the requisite amount of air which needs to be handled by the fan 42 to maintain desired radon reduction.

The current draw of the fan 42 is proportional to the air flow through the fan 42. As a result, measuring the current draw of the fan 42 is an effective measure of the air flow through the fan 42. Thus, by monitoring current draw, slight to large increases and decreases in air volume through the fan 42 may be detected.

As is shown in FIG. 1, a mechanism utilized in the instant method of monitoring radon mitigation systems comprises a control unit 12 and a fan voltage booster 40. Power is supplied to the control unit 12 from an external source of 120 volt power 10 by a 120 volt plug 14. The control unit 12 includes a 120 volt to 24 volt reduction transformer 16, and a current sensing device 20. The fan voltage booster 40 is a transformer matching the reduction transformer 16, which increases voltage from 24 volts to 120 volts. Reduction of voltage by the reduction transformer 16 permits the control unit 12 to be installed with inexpensive low voltage wiring 38, such as two conductor 18 or 16 gauge wire. Power supply to the fan 42 is advantageously protected by an eight amp or less current overload device 18 in the form of a circuit breaker or fuse. In most jurisdictions, such wiring 38 may be installed without hiring a licensed electrician, thus facilitating installation of the control unit 12.

Most commercially available fans 42 require 120 volt current to properly operate. The fan voltage booster 40 increases current from the control unit 12 to the 120 volts required for proper operation of the fan 42. The fan voltage booster 40 may be beneficially attached to the fan 42 by locating it internal to the fan housing (not shown). This location allows for the air handled by the fan 42 to pass over the fan voltage booster 40, thus providing cooling of the booster 40 for reduced energy consumption of the system. Both transformers 16, 40 can be thermally protected such that if either transformer 16, 40 should reach a temperature of concern (110 degrees celsius or other as appropriate for material of construction), the internal windings of the transformer 16, 40 would open and shut down the system 48 prior to reaching a hazardous condition. Use of the reduction transformer 16 and the fan voltage booster 40 thus permits both simple installation of the control unit 12 with low voltage wiring 38, and adequate current supplied to the fan 42.

Figure 2:
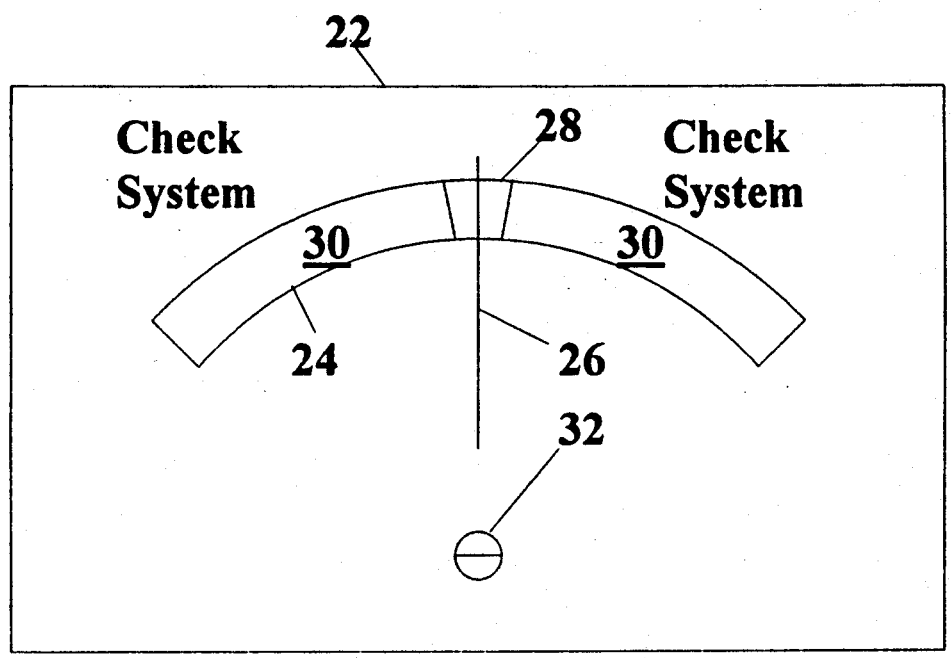
FIG. 2 is a front view of one embodiment of the performance indicator which is one component of the instant invention.

In the preferred embodiment of this invention shown in FIG. 2, the current sensing device 20 comprises an ammeter, with a visible face 24. The ammeter 20 will typically have a range of zero to five amps. The ammeter 20 may be conveniently mounted in a panel 22, positioned in such a way that the face 24 of the ammeter 20 may be easily viewed by any one in near proximity to the control unit 12. Because the ammeter 20 is outside the air stream to and from the fan 42, the ammeter 20 will not tend to create air flow discrepancies as might result from a pressure sensing device.

As is shown in FIG. 2, the face 24 of the ammeter 20 may be marked to create a proper conditions indicator 28 and an improper conditions indicator 30. The proper conditions indicator 28 may simply comprise an area marked in green which corresponds to the portion of the face 24 in which the ammeter needle 26 will be located when the fan 42 is drawing current corresponding to the air flow which has been determined to be advantageous for radon mitigation in the particular situation. During installation of the control unit 12, the installer will adjust the position of the needle 26 via a bias adjust screw 32 so that the needle 26 is located in the area designated as a proper conditions indicator 28 while the fan 42 is operating at its most advantageous volumetric air flow rate. A tamper resistant tape (not shown) may be placed over the bias adjust screw 32 to reduce the potential for casual adjustment. Similarly, areas of the face 24 in which the needle 26 would be located when the fan 42 is drawing too much or too little current may be marked in red or otherwise labeled to constitute the improper conditions indicator 30.

As will be evident, many different types of improper conditions indicators 30 and proper conditions indicators 28 will be possible. If the current sensing device 20 registers current by means of a digital meter instead of a needle on a dial, then a chart placed next to the meter, stating which readings are acceptable and which are not, may together with the digital meter constitute both a proper conditions indicator 28 and an improper conditions indicator 30. Although the improper conditions indicator 30 is an integral portion of the control unit 12, the proper conditions indicator 28 is optional, since proper conditions should exist whenever the improper conditions indicator 30 is not activated.

Since it is important that occupants of the building be notified if the radon mitigation system 48 is not properly functioning, it may be beneficial to create an audible improper conditions indicator 30. This may be accomplished by connecting an alarm 50 or other noise generator to the current sensing device 20, in such a manner that the alarm 50 is sounded whenever the ammeter 20 detects current indicative of improper air flow through the fan 42.

Optionally, a relay 52 may be connected to the ammeter 20 so that the fan 42 is automatically turned off when the ammeter 20 detects improper current draw and thus improper air flow. In this embodiment, the relay 52 could be used to disengage the fan 42 in other appropriate situations, such as if a smoke detector (not shown) sensed the presence of smoke in the environment.

The invention has been described in detail with particular reference to preferred embodiments thereof. As will be apparent to those skilled in the art in the light of the accompanying disclosure, many alterations, substitutions, modifications, and variations ar possible in the practice of the invention without departing from the spirit and scope of the invention.

I claim:

1. A device for monitoring whether a fan is generating air flow within a predetermined range of acceptable air flows, which predetermined range of acceptable air flows corresponds proportionally to an acceptable range of fan current draw, which device receives electric current from an external source of 120 volt electric current, comprising:
   a. an electric plug capable of receiving 120 volt electric current,
   b. a reduction transformer for reducing 120 volt current to 24 volts, connected to said electric plug so that electric current is routed through and transformed to 24 volts by said reduction transformer,
   c. a performance indicator connected to and receiving electric current from said reduction transformer, which performance indicator measures fan current draw of the fan, and indicates whether said fan current draw corresponds to the predetermined range of acceptable air flows, and
   d. a fan voltage booster connected to and receiving electric current from said performance indicator, which booster transforms 24 volt current to 120 volt current, which booster is connected to the fan so that 120 volt current from said booster is routed to and empowers the fan.

2. A device as described in claim 1, wherein said performance indicator further comprises a current sensing device.

3. A device as described in claim 2, further comprising a relay connected to said current sensing device and to the fan so that said relay deactivates the fan when said current sensing device indicates fan current draw which does not correspond to the predetermined range of acceptable air flows.

4. A device as described in claim 2, further comprising an audible alarm connected to said current sensing device so that said audible alarm is activated whenever fan current draw does not correspond to the predetermined range of acceptable air flows.

5. A device as described in claim 2, wherein said performance indicator further comprises an ammeter.

6. A device as described in claim 5, wherein said ammeter is mounted so that a face of said ammeter is visible, and wherein an improper conditions indicator is visibly discernable within said face, which improper conditions indicator will be activated when fan current draw does not correspond to the predetermined range of acceptable air flows.

7. A device as described in claim 6, wherein said improper conditions indicator further comprises a needle movable within said face, moving in response to increases and decreases in fan current draw, which needle will be located in a marked area of said face when fan current draw does not correspond to the predetermined range of acceptable air flows.

8. A device as described in claim 7, further comprising a designated area of said face in which said needle will be located when fan current draw corresponds to the predetermined range of acceptable air flows.

9. A method of monitoring whether a fan is generating air flow within a predetermined range of acceptable air flows, which predetermined range of acceptable air flows corresponds proportionally to an acceptable range of fan current draw, comprising:
   a. supplying 120 volt electric current,
   b. reducing 120 volt electric current to 24 volts,
   c. measuring fan current draw of the fan by means of a performance indicator powered by said 24 volt electric current,
   d. indicating whether said fan current draw corresponds to the predetermined range of acceptable air flows,
   e. transforming 24 volt electric current from said performance indicator into 120 volt electric current, and
   f. empowering the fan with said 120 volt electric current.

* * * * *